United States Patent
Yacoby et al.

(10) Patent No.: US 6,516,311 B1
(45) Date of Patent: Feb. 4, 2003

(54) METHOD FOR LINKING ON THE INTERNET WITH AN ADVERTISING FEATURE

(75) Inventors: Nir Yacoby, Los Angeles, CA (US); Tau (Tony) Qiu, Los Angeles, CA (US)

(73) Assignee: Tau (Tony) Qiu & Howard Hoffenberg, as tenants in common, Los Angeles, CA (US)

( * ) Notice: Subject to any disclaimer, the term of this patent is extended or adjusted under 35 U.S.C. 154(b) by 0 days.

(21) Appl. No.: 09/513,052

(22) Filed: Feb. 24, 2000

(51) Int. Cl.[7] .............................. G06F 17/30; G06F 7/00
(52) U.S. Cl. ......................... 707/3; 707/4; 707/5; 707/6
(58) Field of Search ..................... 707/1–10, 100–104.1, 707/3–6; 705/26–27; 345/733–747; 379/219

(56) References Cited

U.S. PATENT DOCUMENTS

| | | | |
|---|---|---|---|
| 5,572,643 A | | 11/1996 | Judson |
| 5,812,776 A | * | 9/1998 | Gifford ........................ 709/203 |
| 5,813,006 A | | 9/1998 | Polnerow et al. |
| 5,937,390 A | * | 8/1999 | Hyodo ........................ 348/731 |
| 5,946,684 A | | 8/1999 | Lund |
| 5,978,806 A | | 11/1999 | Lund |
| 5,978,817 A | | 11/1999 | Gainnandrea et al. |
| 5,987,508 A | | 11/1999 | Agraharam et al. |
| 6,009,459 A | | 12/1999 | Belfiore et al. |
| 6,029,195 A | * | 2/2000 | Herz ........................ 725/116 |
| 6,061,681 A | * | 5/2000 | Collins ..................... 379/88.13 |
| 6,112,246 A | * | 8/2000 | Horbal et al. ............... 709/230 |
| 6,125,352 A | * | 9/2000 | Franklin et al. ............... 705/26 |
| 6,141,413 A | * | 10/2000 | Waldner et al. ........ 379/265.01 |
| 6,144,991 A | * | 11/2000 | England ...................... 345/733 |
| 6,157,648 A | * | 12/2000 | Voit et al. .................... 370/354 |
| 6,185,194 B1 | * | 2/2001 | Miyake et al. .............. 428/195 |
| 6,247,047 B1 | * | 6/2001 | Wolff ......................... 709/219 |

OTHER PUBLICATIONS

TSX Announces 50,000 User Milestone, Business Wire, Dec. 21, 1999, http://moneycentral.msn.com/investor/news/article.asp . . . /21, BW0370&p=30, 1 page.

Winfire Integrates RealNames Internet Keywords Into Browser Assistant RealNames, RealNames Press Release, Jan. 6, 2000, p. 1–3 http://customer.realnames/Virtual.asp?p.=Eng_Corporate_PressRelease_01060.

* cited by examiner

Primary Examiner—Greta Robinson
Assistant Examiner—Linh Black
(74) Attorney, Agent, or Firm—Law Offices of Howard L. Hoffenberg, Esq.; Howard Leslie Hoffenberg

(57) ABSTRACT

This invention pertains to a method for finding a web page based on telephone numbers with a feature of utilizing the finding method to build traffic to view advertisements. Pursuant to the method, there is established a web page server; a directory database comprised of registrant telephone numbers, registrant criteria and registrant web site pages and an advertising database comprised of advertiser criteria and advertising objects. An Internet user specifies a telephone number and is shown a registrant web site page and an advertising object for an advertiser whose criteria correlates with the criteria for the registrant whose page is being sent to the Internet user.

21 Claims, 3 Drawing Sheets

FIG. 1

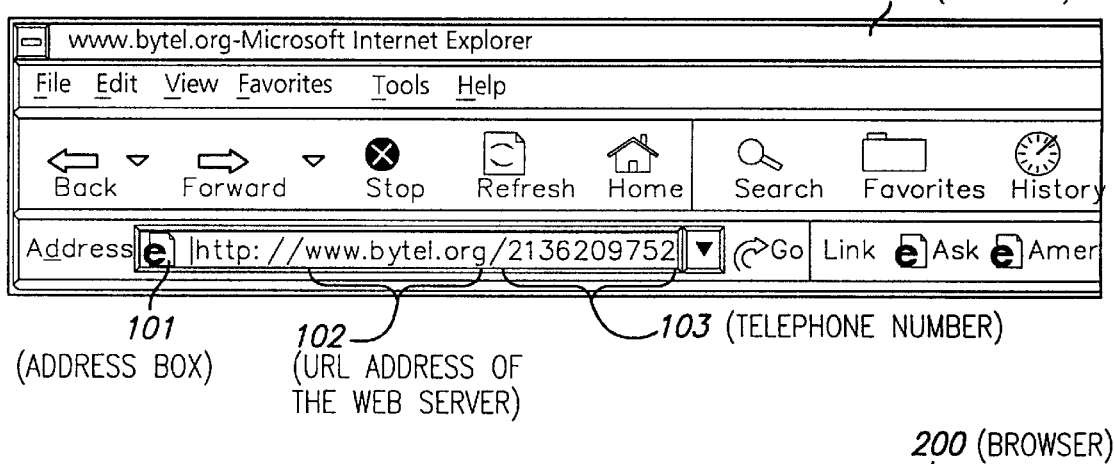

101 (ADDRESS BOX)
102 (URL ADDRESS OF THE WEB SERVER)
103 (TELEPHONE NUMBER)

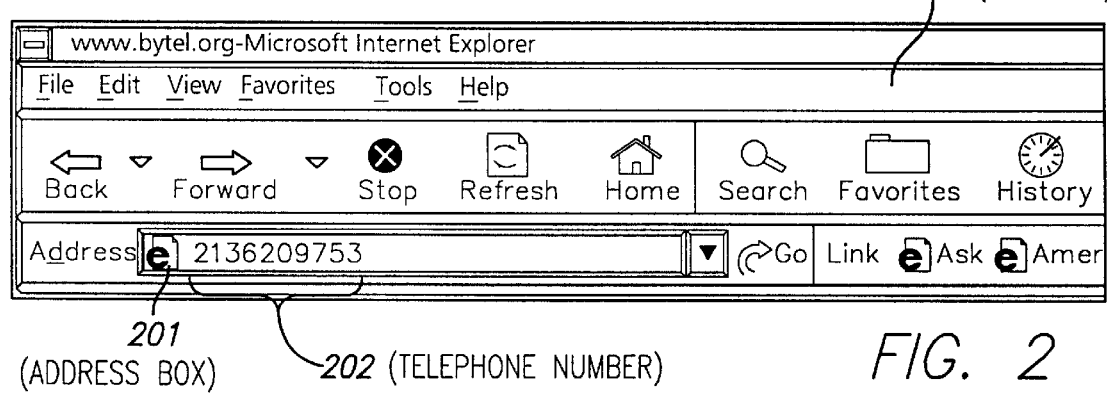

201 (ADDRESS BOX)
202 (TELEPHONE NUMBER)

 A decision point for which the answer is either yes or no

| EMAILS STORED TO BE REVIEWED BY BYTEL'S ADMINISTRATOR | An action transparent to the user that is taken by the parsing server |

| REENTER NUMBER | An action taken by the parsing server that provides feedback to the user |

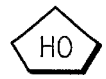 A reference to a different page served by the web page server

 2138209752.bytel.org   User input

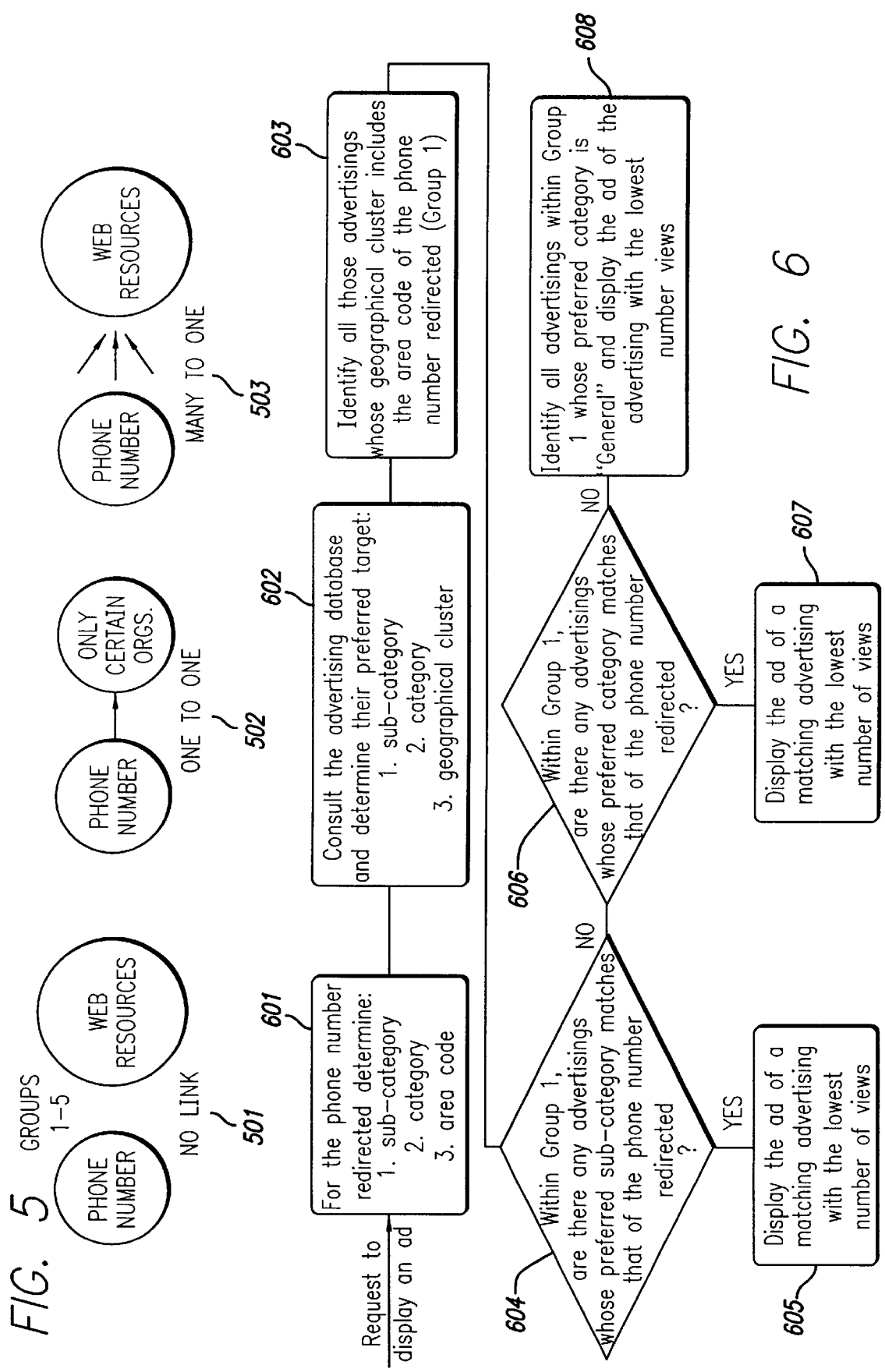

METHOD FOR LINKING ON THE INTERNET WITH AN ADVERTISING FEATURE

CROSS-REFERENCE TO RELATED APPLICATIONS

None

STATEMENT REGARDING FEDERALLY SPONSORED RESEARCH OR DEVELOPMENT

None

REFERENCE TO MICROFICHE APPENDIX

None

BACKGROUND OF THE INVENTION

1. Field of the Invention

This invention pertains generally to methods for redirecting, linking and directory assisting on the Internet and more particularly to a linking method based on telephone numbers with a feature of utilizing the linking method to build traffic to view advertisements.

2. Related Art

There is a global computer network comprised of a vast number of computers and computer networks that are interconnected through communication links. This global computer network is commonly referred to as the "Internet." Resident on these computers and computer networks are documents and applets which are referred to as "resources." These resources are assessable to a general public of Internet users.

Currently, there are an estimated over 5 million registrations to establish sites on the Internet from which resources can be made assessable and an estimated 5 billion pages of resources on the Internet. Business has readily flocked to the Internet to establish sites at which to sell goods and services. Besides sites by businesses, there are numerous content providers of information, graphics, music and the like. In addition, private persons have established sites.

An addressing scheme for accessing resources on the Internet is the "world wide web." Each resource is assigned an address for locating that resource on the web which is called a Uniform Resource Locator ("URL"). A key part of the URL is a portion referred to as the "domain name." The domain name is unique and recognizable. The allowable length of a domain is 67 characters. Another part of the URL is referred to at the top level domain name. The top level domain ("TLD") name is a suffix that goes onto the domain name. There currently are three TLDs (e.g., .com, .net and .org) which may be increased to seven. Under the web, resources are referred to as "web sites" or "web pages."

A browser is a special-purpose application program that effects the requesting of resources and the displaying of resource. An Internet user that goes looking for resources is referred to as a "surfer." A browser has an address box in which to enter a URL. It is difficult for Internet users/surfers to remember or record URLs for entry into a browser address box. Further, it is tedious for Internet users/surfers to type into the address box a URL.

There is no "official" listing of what is available and/or official "table of contents" for the world wide web. This has resulted in a number of web sites called "portals" that offer search engines which provide a search interface covering a large range of world wide web resources. The search engines are based on searching key terms and using Boolean logic to connect the key terms (that is -and-, -or- and -not-). The search engines are cumbersome to use. Further, the search engines generate results which are not of interest to the web surfer.

The World Wide Web is an attractive venue in which advertise products and services. Content providers, web sites by businesses and web sites by private persons motivate individuals to surf the Internet and spend time on the Internet. Time spent by individuals on the Internet is rivaling time spent watching television. The price of personal computers has become and is becoming generally affordable and they are commonplace in households. In addition, the world wide web can be accessed through televisions enabled to render web page (that is "web TV"), cellular telephones, palm top computing aids and microprocessor enhanced telephones. The Internet provides an opportunity for advertising that rivals commercial television.

There is an advertising opportunity that arises out of the problems Internet users face in finding a web site. The portals for search engines display of one or more advertisements. The advertising at these portals has limitations. The advertising is either unfocussed general advertising or based on an Internet user's past surfing history. The advertising is not targeted to an Internet users immediate wants and needs.

A partial solution to the limitations of the search engine is found in U.S. Pat. No. 5,812,776 by Gifford (filed on Jun. 7, 1995) which allows the use of a telephone number to find the web site belonging to an individual, business or other entity. This patent teaches a method which involves an Internet establishing a first socket (also called a channel) and submitting a telephone number. At the remote web site, the telephone number is mapped to a URL using a translation database. The remote web site sends back to the Internet user a REDIRECT command. Using this redirect command, the Internet user establishes a second at the URL and retrieves the desired web site. The methodology is deficient in that lacks an efficient way to map a telephone number to a web site; does not directly display a web page; requires the transmission of four packets over two sockets; is slow and time consuming; is subject to transmission failures; and does not provide any vehicle for targeted advertising.

A partial solution to the limitations in advertising on the Internet is found in U.S. Pat. No. 5,572,643 by Judson (filed on Oct. 11, 1995). This patent teaches a method n to display a "popup" advertisement when the user clicks a hyperlink on web page. This is accomplished by encoding the web page with a masked "mini" hypertext documents (or applet) containing an advertisement which resides in the computers memory (RAM), without the user knowing it, ready for display upon the clicking of a hyperlink. The Judson methodology is limited to advertisements that are encoded in the presently being viewed web page and does not allow for advertising by third parties. A further deficiency is that it is not operatively connected to a search engine and concomitantly no targeting of focussed advertisement to a web surfer.

Accordingly, there exists a need for methodology by which to efficiently and effectively navigate the web by telephone numbers.

There exists a need for a simplified methodology which involves fewer transmissions across the Internet over fewer channels (also called sockets) where a Internet user goes from inputting a telephone number to a desired web page.

There exists a need for a methodology by which to present an Internet user with a targeted advertisement while that user seeks to view a desired web page upon inputting a telephone number.

There exists a need for a business method by which to sell advertisement to advertisers who desire to have advertisements viewed by a web surfer who is surfing the net with an interest in the advertiser's goods or services.

There exists a need for a method to display focussed advertisements to web surfer that are targeted to that surfers present interests and needs.

The present invention satisfies these needs, as well as others, and generally overcomes the presently known deficiencies in the art.

SUMMARY OF THE INVENTION

The present invention is directed to a methodology that efficiently and effectively takes an Internet user form submitting a telephone number to viewing a web page. The present invention is further directed to a methodology to display a targeted advertisement to an Internet user for a good or service which is of present interest to the Internet user based on that Internet user's desire to view a web page corresponding to a particular telephone number.

It is object of the present invention to provide a simple and quick method for an Internet user to navigate to a web page by typing a telephone number. It is another object of the present invention to reduce the number of packet transmissions and sockets (channels) that occur in a redirect. It is another object of the present invention to provide a more efficient method to translate a telephone number to viewing a web page.

It is object of the present invention to utilize traffic generated by a telephone number to web page server to build an audience for advertisements on the net. It is another object of the present invention to provide an enhanced method of advertising on the Internet which displays to Internet users advertisements that are of immediate interest to the Internet user are presented to that user.

One aspect of the present invention is a method for an Internet user to view a web page. The method comprised steps which are as follows. There is established a web page server where the server has a URL address and an Internet interface which allows remote access through the Internet. There is established a directory database server with a directory database comprised of registrant telephone numbers and associated therewith registrant web pages. An Internet user establishes a socket to the web page server at its URL address through the Internet. The Internet user interacts with the web page server where the user's interaction includes at least part of a telephone number. There is executed a query of the directory database to yield a query result comprising a registrant web site page corresponding to the user interaction. This followed by a sending the page to the Internet user through the socket established by the Internet user.

Another aspect of the present invention utilizes the above method to generate traffic for advertisements on the Internet. This aspect of the invention expounds on the previous method as follows. The directory database also includes registrant criteria. There is established an advertising server with an advertising database comprised of advertiser criteria and associated therewith advertising objects. There is an executing of query of the advertising database to yield a query result of an advertising object for an advertiser whose criteria correlates with the criteria for registrant whose page is being sent to the Internet user. There is a sending of the advertising object to the Internet user.

The previously described versions of the present invention has many advantages which include a fast, efficient and simple method to take an Internet user from a telephone number to a web page and the web page can be any page at a web site. Additional advantages are a reduced likelihood of an error or failure and multiple telephone numbers being mapped to the same web site. A further advantage is delivering to an advertisement to the Internet user based on that Internet user's present interest.

BRIEF DESCRIPTION OF THE DRAWINGS

These and other features, aspects and advantages of the present invention will become better understood with reference to the following description, appended claims and accompanying drawings where:

FIG. 1 is a representative browser illustrating the address box with text comprising a subdomain name top level domain name followed by a slash followed by a formatted telephone number.

FIG. 2 is a representative browser illustrating the address box with text comprising an unformatted telephone number;

FIG. 3 is an explanation of the symbols that are used in flow charts;

FIG. 5 is a diagram illustrating an advantage of the database structure of the present invention; and FIG. 6 is a flowchart diagram of a method according to the present invention for an Internet advertising system.

DETAILED DESCRIPTION OF THE INVENTION

Figure 4:
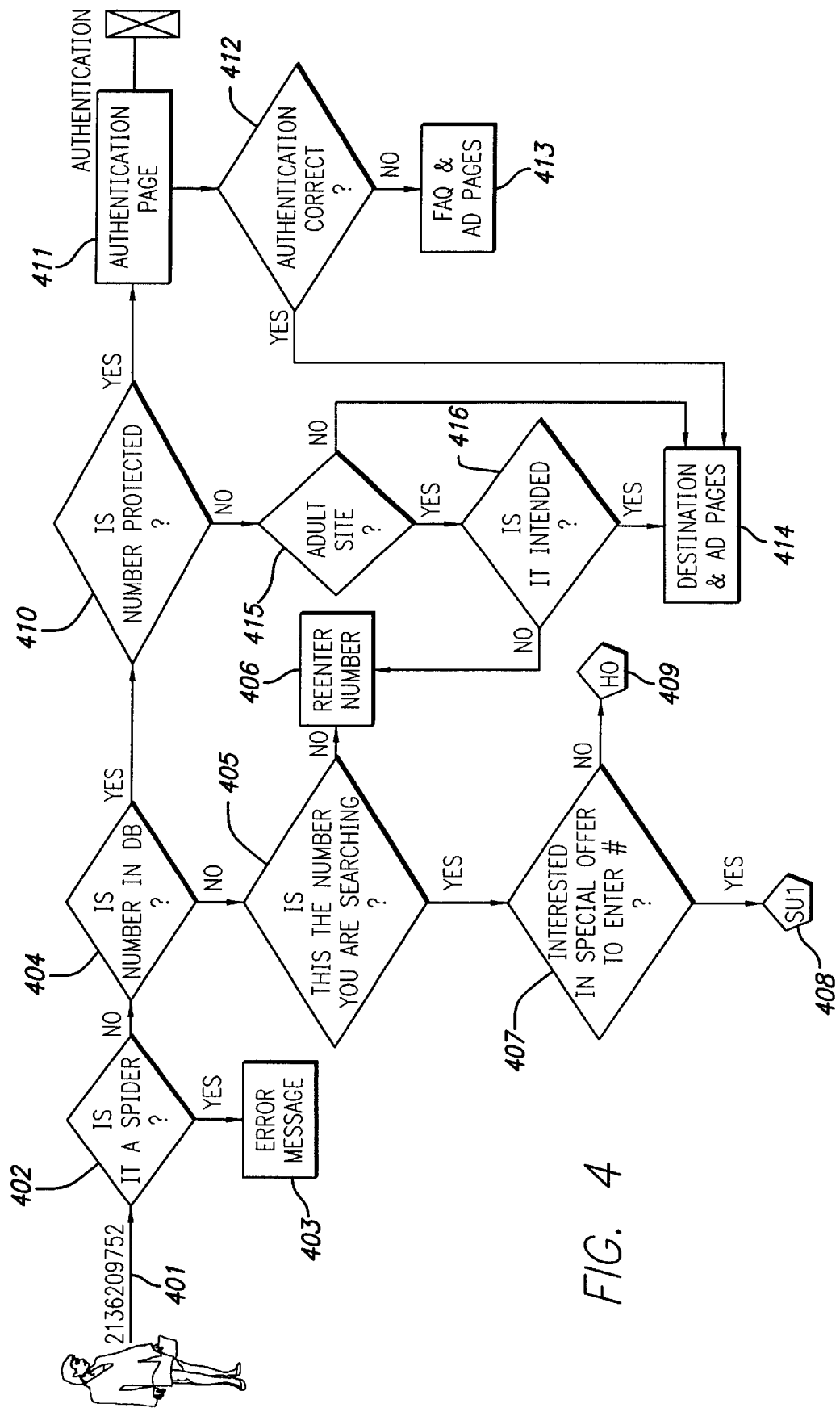
FIG. 4 is a flowchart diagram of a method according to present invention for viewing a web page.

A web site is typically comprised of hypertext documents. The documents can be static, dynamic or multimedia. Typically, there are multiple pages at a web site that are linked by hyperlinks. Each page of the web site has a URL. A URL is explained in more detail both above and below. There is a first page which is an index page. This first page typically has hyperlinks to transfer to other documents at the web site. There may also be a search engine within the web site to go to different pages at the web site.

A browser is an application program which requests and displays returned documents over the Internet. The browser establishes a node on the Internet that is temporary point of presence ("POP"). From this POP, the browser establishes a socket (also called a channel) to another node on the Internet, usually a document server which is referred to as web page server. The browser typically has an address box. Depending on the particular browser used in an embodiment of this invention, the address box may be called a text box, destination field, location field, Uniform Resource Locator ("URL") field or similar name.

In more detail, a browser sends a uniform resource locator (URL) to a Web server and the Web server returns a Hypertext Markup Language (HTML) document for the browser to display. A URL is typically in the form of "host.subdomain.domain.TLD/path/file" or the like. The URL refers to a document named "file" which is found on the path "/path/" on the machine which has the domain name "host.subdomain.domain.TLD".

The present invention is a simple method for an Internet user to view a web page and interact with the web page using a telephone number to get to the page. In a preferred embodiment of the present invention, the Internet user will be shown an advertisement which correlates to the web page which the Internet user seeks to view.

According to the present invention, multiple software servers providing multiple services are established. These multiple software servers and services can be established on one physical general purpose digital computing machine (i.e., what is commonly referred to as a computer); on several general purposes digital computing machines which communicate with each other; one special purpose digital computing machine or on several special purpose digital computing machines which communicate with each other. If multiple machines are used, they can be at the same site or different sites. In a typical and preferred embodiment of the present invention, multiple software servers providing multiple services are established on one physical machine.

Further, the present invention is described in terms of multiple databases. It within the scope of the invention that any two or more of these database can be combined into a single database such that two or more databases are satisfied by one physical database. Likewise, the invention is described in terms of multiple servers. It within the scope of the invention that any two or more of servers can be combined into a single server such that two or more servers are satisfied by one physical server. Vice versa, a database and/or server functions can be subdivided into parts such that two or more physical components satisfy one element.

A first software server that is established is a web page server. This web page server has an interface to the Internet and a URL address. It performs the services of establishing a socket (also referred to as a channel) with an Internet user, receiving information and commands from an Internet user, sending information and commands to the Internet user, returning HTTP documents and web pages to an Internet user. The receiving and sending of information and commands is usually done in the format of a dialog box. The invention is adaptable such that the web page server can run commercially or publicly available programs which provide web page service. One such program is Apache which is an open source program for which a general public license is available.

A second software server that is established is a parsing server. The parsing server is the central control module. It gets its name from also performing a parsing function. The invention is adaptable such that the code run by the parsing server can be in any commercially or publicly available language that has a substitution function which provides for the setting of delimiters and replacements and has commands to perform simple logic. Examples of these languages are as visual basic, C, C plus plus (C++), visual C and the like. A preferred program language is Program Extraction and Report Language ("PERL") 5.005.003 published by Larry Wall for which a general public license is aivialable.

As for the central control aspect of the parsing server, this is discussed more thoroughly below after introducing the other software servers. This discussion is conducted with reference to FIGS. 4 through 6. Discussed at this juncture is the parsing activity of the parsing server. In particular, the parsing server parses a user interaction to yield a parsed user interaction. In addition, the parsing server parses a query result to form a parsed query result separating out values, key words, parameters and/or fields. Examples of key words or fields are registrant web site URL, registrant category, advertiser category, registrant location, advertiser location and advertising object.

The parsing server parses a user interaction. A user interaction is comprised of a telephone number and optionally other characters. The telephone number can be either a formatted telephone number or an unformatted telephone number. An unformatted telephone number is a data string of digits without any punctuation. The punctuation typically found in a telephone number is left parenthesis, a right parenthesis, a comma, a period and a dash. An example of an unformatted phone number is "2136213060". A formatted phone number has one or more punctuations. An example of a formatted telephone number is "(213)621-3060". As indicated, as used herein, the phrase "telephone number" can be either an unformatted telephone or a formatted telephone number.

The parsing server parses the telephone number to replace characters. This done by a PERL extraction and substitution command is of the form "s/telephonenumber ith the telephonenumber/replacement/." Except for these illegal characters (explained below) PERL will extract digits from punctuation, remove spaces and provide an unformatted telephone number of pure digits. While the invention is described in terms of a PERL command, as mentioned above any commercially or publicly available language that has a substitution function which recognizes any or all of the formatting characters can be used.

As explained here and in more detail below, in embodiments of this invention, an Internet user inputs a telephone number in a query box on a portal page or through a special command on a browser. In other embodiments of the present invention, an Internet user inputs a phone number into the address box of a browser. In embodiments which utilize a query box on a portal page or a special command on a browser, the parsing operation can be used to replace all punctuations, including dashes, dots and parenthesis. In embodiments which utilize inputting a phone number into the address box of a browser, the allowable characters are limited by the rules established by the Internet Protocol. Typically, illegal characters are left parenthesis, a right parenthesis, a comma, a period, a dash.

In a preferred embodiment of the present invention, the parsing server parses a telephone number to replace and add characters to form an unformatted telephone number of fixed length. The length of a telephone number varies from 9, 10, 12, or 13 digits based on a country's regulations and/or switching system. An unformatted telephone number of fixed length is an unformatted telephone number having a specified number of digits. A registrant telephone number of fixed length is an unformatted telephone number having the number of digits employed by the telecommunication system where the registrant is located. In the alternative, a registrant telephone number of fixed length is an unformatted telephone number having 13 digits; that is, the number of digits for North America.

The parsing server adds characters to form an unformatted telephone number of fixed length according to any of the following options. In one option, the parsing server performs simple logic to assess if the unformatted telephone number is 10 digits. If it is, then a "001" is appended as a prefix, that is, the North American country code. In another option, if the parsing server assesses that the unformatted telephone number is not of the fixed length, a queue is sent to the web page server and the web page sends an error message or dialog box to the Internet user prompting the Internet user to provide an area code, country code and/or other missing characters or digits. Upon reply by the Internet user, the parsing cycle repeats itself. In another option, the web server has different URLs for different countries. Internet users in each country are instructed to use the URL for the country in which the Internet users is located. An assumption is then made to insert the country code that is the same as that for the country where the Internet users is located.

Another function of the parsing server is to parse a query result to form a parsed query result separating out values, parameters and/or fields. A query result is a record from a database; for example, a registrant record from the directory database or an advertiser record from the advertising database. The query result is comprised of one or more dimers where each dimer consists of a field name (also called a key word) and a value. For example "Auth_Code" and "3" (This means that in an authentication code field a level 3 security is required.). It is noted that the value can be an object such as an advertising object or a page of a web site. Using PERL, the parsing server looks for patterns defined in PERL; namely, a key word followed by a value. The parsing sever separates, for example, registrant web site URL, registrant category, advertiser category, registrant location, advertiser location and advertising object. These can then be used in further queries.

Optionally, the parsing server has a utility commonly known as a spider detector. A spider detector functions to deny access to user interactions that are automatically generated by software.

A third software server that is established is a directory database server. The directory database server has an interface for receiving queries, a capability to conduct queries and return results. The invention is adaptable such that the database server can generally run any commercially or publicly available database program from sources such as Oracle and Microsoft. Database programs employing structured query language ("SQL") language are preferred. A more preferred program is SQUID which is an open source program available on a general public license.

In a preferred embodiment of the present invention, the parsing server is programmed in PERL and the directory database server utilizes SQUID. Under this configuration, the directory database server has a two tier interface. The first tier is a generic interface for PERL to speak with any database. This interface is known as a "DBI driver" or "DBI". The second tier is an interface which communicates between the DBI driver and the SQUID database. This interface is known as a "database driver" or "DBD". Thus, there is the following interface into the database PERL:DBI::DBD:SQUID. There is the following interface out of the database SQUID:DBD::DBI:PERL.

The directory database server has a directory database. This directory database contains records for individuals, businesses, government entities and anyone who establishes a presence on the Internet. Those who have a record in the database are referred to as registrants. A record on a registrant can be created by someone supplying information through a registration process. A record on registrant can be created from information available from public and private sources without the subject of the record supplying information in a registration process. Accordingly, the term registrant is used in a broad sense and is not limited to those who create a record by supplying information in a registration process. An authorized registrant is someone who has participated in some degree in a registration process such that a security system is established which can the genuine registrant and with a fair degree of certainty differentiate imposters.

At a minimum, a record on a registrant in the directory database is comprised of a registrant telephone number and associated therewith the registrant web site page. In a more preferred embodiment of the present invention, there are a plurality of records on registrants in the directory database. Each record is comprised of fields. The minimal fields are unformatted telephone numbers and associated therewith registrant web site URLs for a web site or web page belonging to the registrant. In a most preferred embodiment of the invention, there are also fields for registrant name, business category/industrial code, business subcatagory, location, sublocation and a field to count the number hits on the records. Optionally, the record contains one or more fields to track and store information on a registrant's web surfing history and number of hits.

Optionally, there may be fields in the directory database to store security levels and authentication information. As explained below in more detail, an Internet user specifies security information such that upon proper specification of security information, the Internet user is allowed to view the page of a registrant's web site.

The directory database server through the interface conducts a query of the directory database to yield a query result. This usually involves a matching a value for a telephone number in a telephone number field with the telephone number in the user interaction. It can mean matching a value for a telephone number and values for other fields according to a criteria. This criteria can apply weighting factors to the fields.

In a preferred embodiment of the invention, the query is executed as a minimized mismatch search. In a minimized mismatch search, the unformatted telephone number is compared to telephone numbers in the directory database where a top priority hit is an exact match of all digits. If there are no top priority hits (that is an exact matches of all digits), the next highest priority is a hit where there is a one digit mismatch. If more than one record in the directory database satisfies this one digit mismatch criteria, then a record meeting the criteria is randomly selected from all those meeting the criteria. An alternative procedure is for the computer to stop after finding five one digit mismatches and then randomly selecting one of these.

If there are no one digit mismatches, the next highest priority is a hit where there is a two digit mismatch. If more than one record in the directory database satisfies this two digit mismatch criteria, then a record meeting the criteria is randomly selected from all those meeting the criteria. The minimized mismatch search can be extended to three or more mismatched digits.

A fourth software server that is established is caching server. Located on the caching server is a caching database. As with the directory database, the invention is adaptable such that the caching server can generally run any commercially or publicly available database program from sources. A preferred program is SQUID which is an open source program available on a general public license.

The caching server stores web site pages. The pages are indexed by there URL addressed. Upon command, the caching server returns a web site page corresponding a registrant web site URL. The registrant web site URL is derived from a query of the directory database. It is understood that any marker can be used in lieu of registrant web site URL. This same marker needs to be used in the directory database instead of registrant web site URL. Accordingly, in the context of referring to the index of the caching server and filed entries in the directory database, the phrase registrant web site URL has a special meaning to include any marker that is used in the index in place of the URL.

In a preferred embodiment of the invention, the cached pages of web sites for registrants in the caching server is periodically updated. This can be done by in one operation for the entire database by going to the web and downloading the current page. It can be done in sequential batches for a part of the database with a rotation scheme so that within a given period the entire database is updated. It can be done on special command. This includes if a queue is received for a particular page and no such page is cached.

A fifth software server is established and this is advertising server. The advertising server has an advertising database. As with the directory database, the invention is adaptable such that the advertising server can generally run any commercially or publicly available database program from sources, as described above. A preferred program is SQUID which is an open source program available on a general public license. As with the directory database server, there is an interface, as described above.

The advertising database is comprised of records having fields for advertiser criteria and associated therewith advertising objects. In a preferred embodiment of the present invention, the database contains records having fields for advertiser criteria which typically consists of fields for business category/industrial code, business subcatagory, location, sublocation. The advertising object can be static (e.g., HTML text), dynamic (e.g., Java Applet) and/or multimedia (e.g., audio and video). The object may contain a hyperlink to advertisers website; contain a button/queue to be print; contain a button or queue to be saved; and/or allow the user to compose a response e-mail. In the alternative, this database can be a part of the directory database.

In a most preferred embodiment of the invention, there is an Internet advertising system for advertisers which involves at least one advertiser paying an amount of money to establish an advertising object in the advertising database. In the advertising database, one of the fields in a record is the amount of money paid by the advertiser to establish the advertising object in the advertising database. This is part of the advertiser criteria. In selecting an advertising object for an advertiser whose criteria correlates with the criteria for registrant whose page is being sent to the Internet user, the advertising object is selected, in whole or in part, based on the amount of money paid by the various advertisers.

The manner in which advertising server executes a query of the advertising database to yield a query result of an advertiser record for which the advertiser criteria correlates with the registrant criteria is discussed in more detail below in the context of the central control aspect of the parsing server and reference is made to FIG. 6.

According to the present invention, an Internet user interacts with the web server using a browser or other interface to input a phone number. In one option, there is a portal having the URL for the web page server. In this option, an Internet user inputs a URL for the portal which returns a query page. Through the query page of the portal, the Internet user inputs a phone number which is returned to the web page server. In another option, an Internet user accesses the portal by hyperlinking from another web site or hyperlinking using a public search engine such as Yahoo, Lycos, Alta Vista and the like.

In another option, the browser is specialized to have a command a query box which directly sends an input to the web page server. For example, at a point on the graphical interface for the browser there is a box for the Internet user to input a phone number which is returned to the web page server. The browser has the functionality to establish a socket (also referred to a channel) over the Internet between the Internet user's browser and the web page server.

Referring to FIG. 1, in a preferred option, the user interaction is by means of a browser (100) wherein the interaction comprises the user specifying in the address box (101) of the browser the URL address of the web server (102) followed by a slash (that is, "/") and a telephone number (103). Depending on the particular browser used in an embodiment of this invention, the address box may be called a text box, destination field, location field, Uniform Resource Locator ("URL") field or similar name. In the example shown in FIG. 1, the web server has an addressed comprised of a host, domain, subdomain and top level domain; that is, "http://www.bytel.org". This followed by a slash and a unformatted telephone number of "2136209752". Although an unformatted telephone number is illustrated, a user is likely to input a telephone number with some punctuation. The user Internet user actuates a send command using the key board and/or mouse. The browser has the functionality to establish a socket (also referred to a channel) over the Internet between the Internet user's browser and web server.

Referring to FIG. 2, in a more preferred option of the present invention, the interaction is by means of a browser (200) wherein the interaction comprises the user specifying in the address box (201) of the browser a telephone number (202). In the example in FIG. 2, typed into the address box is text specifying the unformatted telephone number of "2136209752". Although an unformatted telephone number is illustrated, a user is likely to input a telephone number with some formatting. The user Internet user actuates a send command using the key board and/or mouse.

The browser completes the interaction by adding the URL address of the web server. U.S. Pat. No. 5,978,817 to Gainnandrea (filed on Mar. 21, 1997) which is incorporated by reference. This patent teaches modules to accomplish the foregoing. U.S. Pat. No. 6,009,459 Belfiore (filed on Jan. 10, 1997) which is incorporated by reference. This patent discloses preprocessing text entered into the address box of a browser by prepending a scheme or prefix to the beginning of the text.

As mentioned, one aspect of the parsing server is a central processing module. This aspect of the parsing server is explained in a simultaneous discussion on how to use the invention. Referring to FIGS. 3 and 4, an Internet user enters a telephone number followed by the domain name into any Internet browser address box; for example, "2137086950.bytel.org" (401). A socket is established by which this identifying information is sent to the web page server at ByTel.Org. The parsing server reads the Internet user's identifying information and determines if the navigator is a spider (a software program that generates automatic queries to retrieve information) based on the number of requests sent by that purported Internet user, the duration of the requests, and the like (402). If it is determined that the navigator is a spider, the request is blocked and the web page server sends a warning (403).

The parsing server parses the user interaction and the parsed result is sent to the database server wherein a query is formulated at to whether the number is in the directory database (404). The result from the user database server has in this embodiment at least two fields; namely, URL and Status. This result is sent to the parsing server for parsing and logical operations.

If the URL field is empty, that is, the telephone number is not the directory database, the parsing server queues the web page server to send a dialog box to ask the inter net user to confirm the telephone number entered (405). If the number was entered incorrectly, the Internet user is offered an opportunity to re-enter the number (406). If the telephone number was entered correctly, the database server registers this telephone number in the unfulfilled database and a special offer is made to the Internet user to register this telephone number in the directory database (407). If the Internet user accepts this offer, the Internet user is transported to a registration page (408). If the Internet user declines the offer, the Internet user is transported to a home page for the web page server (409).

U.S. Pat. No. 5,987,508 to Agraharam (filed on Aug. 13, 1997) is incorporated by reference. Methods set out in that patent can be employed in the current invention. An embodiment of the present invention employs the method of after receiving a telephone number, initiating a call to the telephone number to which a message is communicated. That message can prompt the number owner to register and/or inform that a user interaction has been received. Another embodiment of the present invention employs the method that where there is a former telephone number that was previously associated with an individual or entity and the individual or entity is associated with a new telephone number of translating the former telephone number to the new phone number. Once the former telephone number is translated to the new telephone number, the remainder of the steps of the method are executed using the new phone number.

Another embodiment of the present invention employs the method of forwarding a message to the Internet user that there is a new telephone number. Another embodiment of the present invention employs the method that after receiving a telephone number with an invalid area code where there is another area code valid for the telephone number of modifying the telephone number by using the other area code. In this embodiment, the modified telephone number is used in executing the remainder of the steps to send a registrant web site page to the Internet user.

Returning to FIG. 4, if URL field is not empty, that is, the telephone number is in the directory database, the parsing server looks at the Status field in the parsed search result returned from the second parsing server (410). If Status field is not empty, i.e. this URL address was restricted by the user to allow access only to possessors of an authentication code, the Internet user is asked to enter the authentication code (411).

The authentication code or information can be a name, e-mail address, password and the like. The authentication information can be biometric such as a fingerprint or voiceprint. For finger print verification, an example of a system is the FC100 FINGERPRINT VERIFIER available from Startek, a Taiwanese company. For a voice verification, an example of a system is that available from SpeakEZ, Inc.

In an alternative embodiment of the present invention, there are one or more fields for security and/or authentication information in the record for a registrant in the directory database. In a typical situation, there is a first field specifying a security level second and further fields specifying security parameters. The procedure begins by the parsing server checking the value in the first field to determine if a registrant has imposed a security limitation and what is the limitation. In its simplest form, the security level field contains "on" or "off" data; namely, the field contains either a —"0" or "1"—, —"N" or "Y"— or like pair of denominators. In more complicated forms, the field contains numerals or data corresponding to various degrees of security.

The parsing server compares the entered authentication code against the authentication code in the directory database (412). In case of a mismatch, the Internet user is transported to a help screen explaining the nature of the service and offering on-line help (413). If the two match, the parsing server sends the URL associated with the telephone number (or other marker which being used to index a database and particularly one on a caching server) to caching server (or other server being used to store pages of web sites of registrants). The parsing server also determines the most appropriate advertising object to be shown to the user based on logic described herein (414). Optionally, the page view request and the selected advertising is recorded in a history field in the directory database (not illustrated in FIG. 4.)

In an optional and preferred procedure, if the status field is empty, the parsing server checks the category to which the registrant belongs. That is, in the directory database, the records for registrants have a field for category. The value or information in this field part of the parsed search result. The parsing server determines if the associated category is an adult site (415). If the category is not an adult site, the parsing server instructs the web page server to proceed as above to display to the Internet user a page and advertisement (414). If the category is an adult site, the Internet user is asked to confirm that this is intended (416). If it is not intended, the Internet user is asked to reenter the telephone number (406). If it is intended, the parsing server proceeds as discussed above (414).

In an alternative embodiment of the present invention, there is added a mechanism for remote access to the directory database by one or more authorized registrants to edit records in the directory database. An individual or business registers with the entity establishing the directory database to become an authorized registrant. This is accomplished by the individual or business submitting a request to register which specifies a return e-mail address. Upon receipt of the request, the entity establishing the directory database generates a password and emails the password to the individual or business at the specified e-mail address. In edition, the database can be proximally edited at the site of the database. This editing would be done by a database manager, technician, information specialist and the like.

The authorized registrant can then via the Internet log in to the computer upon which the directory database is established by providing the e-mail address and password. At which point, the authorized registrant can edit records pertaining to the authorized registrant. Optionally, the entity establishing the directory database further provides the authorized registrant with the ability to create additional records in the directory database. Optionally, the entity establishing the directory database further provides the authorized registrant with the ability to selectively indicate what information should be displayed to which users who access the record.

Referring to FIG. 5, directory database allows for multiple different registrant telephone numbers are associated with the same registrant web site page. By way of contrast, in a first scenario there are no links (501). Accordingly, when a user enters a telephone number for an individual or business in the address box of the browser and strikes or clicks on a return key at the user's interface, nothing happens and/or there is an error message.

Again by way of contrast, in a second scenario, there is a one to one link (502). The user enters a telephone number, the browser completes the user's interaction by adding a URL and the information is sent to a computer having a directory database. The directory database has a simple indexing system where for a given web site URL there is only one cross-referenced telephone number.

Pursuant to the present invention, the directory database can have multiple different registrant telephone numbers are associated with the same registrant web site page (503). The directory database is comprised of records for registrants with fields that include website URL (or other marker used in the caching database) and telephone number. It possible to have records with different numbers in the telephone number field and the same website URL. Accordingly, an Internet user specifying any of these numbers will view the same web site page.

As mentioned, in the Internet advertising system for advertisers, an advertising object for an advertiser is correlated with the page being sent to the Internet user. Referring to FIG. 6, registrant criteria is ascertained (601). The directory database contains records for registrants. Each record contains fields for registrant telephone numbers, and web site URLs and also, information on registrant business category/industrial code, business subcatagory, location and sublocation. This is referred to as the attributes of the web site. As explained above, the database server returns a query result containing sub-category, category, and area code which is parsed by the second parsing server and sent to the web page server.

While the Internet user waits for to view a page for a registrant and interact with the registrant's web site, a parallel correlation process occurs. In this parallel correlation process, the parsing server sends a query to the advertising database server (602). The query returns a query result of advertiser criteria such as sub-category, category and geographical cluster (geographical area code cluster).

First, there is an identification of those advertisers in the geographical area code cluster of the telephone number of the registrant (603). These advertisers make up a group referred to as Group 1. A geographical area code cluster is an aggregation of area codes which an advertiser has identified as the target for a particular advertising. Within Group 1, the advertising server queries the search result and applies logic to determines if there are any advertisers whose sub-category matches that of the telephone number redirected (604). If there is a match, the advertising object of a matching advertising with the lowest number of cumulative views is sent by the parsing server to the web page server to be displayed to the Internet user (605). The parsing server can send a queue to make a log entry in a hits counter in the advertising database (not shown in FIG. 6).

If there is no sub-category match, the advertising server queries the search result and applies logic to determines if there are any advertisers whose category matches that of the registrant (606). If there is a match, the advertising object of the advertiser with the lowest number of cumulative views is sent to the views is sent by the parsing server to the web page server to be sent to and displayed by the Internet user (607). The parsing server can send a queue to make a log entry in a hits counter in the advertising database (not shown in FIG. 6).

If there is no category match either, the advertising server queries the search result and applies logic to determines if there are any advertisers whose "General" matches matches that of the registrant (608). If there is a match, the advertising object of the advertiser with the lowest number of cumulative views is sent to the views is sent by the parsing server to the web page server to be sent to and displayed by the Internet user. The parsing server can send a queue to make a log entry in a hits counter in the advertising database (not shown in FIG. 6).

In a more preferred embodiment of the invention, advertisers pay an amount of money to establish an advertising object in the advertising database. This amount of money is a value in a field in the advertising database and the advertiser criteria comprises the amount of money paid to establish an advertising object. The correlation upon which an advertising object is retrieved is based, in whole or in part, on the amount of money paid (not shown in FIG. 6.) In an alternative embodiment, more than one advertising object is retrieved. The objects are either sequentially or simultaneously displayed on the user's interface (not shown in FIG. 6.)

In an alternative embodiment of the present invention, a Internet user's surfing history is used in part to correlate an advertising object to be retrieved in response to the user interaction. Any the databases previously described as being established or special database can contain records with fields storing web surfing history of Internet user. This data can be gathered with the aid of cookies. U.S. Pat. No. 5,948,061 owned by DoubleClick is incorporated by reference. This patent teaches methodology to collect statistics on the use of on-line advertisements by Internet users. Amongst other parameters, click through response is measured.

The previously described versions of the present invention has many advantages which include a fast, efficient and simple method to take an Internet user from a telephone number to a web page. There is a concomitant advantage of a reduced likelihood of an error or failure. Multiple telephone numbers belonging to one registrant can be mapped (translated) to the same web site. In the alternative, multiple telephone numbers belonging to various department, offices and/or resources within a registrant can be mapped (translated) to different URLs. If a registrant so desires, security features can be imposed to limit access to a web site and/or protect privacy. If a registrant so desires, editing features can be added to facilitate a registrant modifying data with ease. The mapping can be designed to accommodate foreign telephone numbers.

The aspects of the invention pertaining to a business method of Internet advertising has many advantages which include delivering to an Internet user focused advertising based on that Internet user's present interest in viewing a web site. The selection parameters for the focussed advertising can include geographical parameters. Concomitantly, advertisers do not waste resources by advertising to Internet users who are either not interested in a particular product or service, or out of the Internet users or advertiser's geographical preference.

EXAMPLES

The following examples further describe and demonstrate embodiments within the scope of the present invention. The examples are given solely for the purpose of illustration and are not to be construed as limitations or restrictions of the present invention, as persons skilled in the art will quickly realize many variations thereof are possible that are all within the spirit and scope of the invention.

Example 1

The following is a prospective example. The directory database is inputted to contain the following record:

| USER | TELEPHONE | CATEGORY | SUBCATEGORY | LOCATION | HITS |
|---|---|---|---|---|---|
| Law Offices of Howard L. Hoffenberg | 0013106705825 | Attorney | Intellectual Property | Los Angeles | — |

The advertising database is inputted to contain the following record:

| | | | | | |
|---|---|---|---|---|---|
| O'Melveney & Meyers | Attorney | Intellectual Property | Los Angeles | — | |

A user types in the address box "(310)670-5825". The telephone number is deformatted to 3106705825. Then there would by a query of the directory database based on this telephone number. Pursuant to this hypothetical example, there is an exact match for the telephone number for the Law Offices of Howard L. Hoffenberg. Then there would be an extraction of information in the Category, Subcatagory and Location fields in the directory database for the Law Offices of Howard L. Hoffenberg. That is, -Attorney-, -Intellectual Property- and -Los Angeles-. These values (parameters) would be used to query the advertising database. Pursuant to this hypothetical example, there is a match with the record for O'Melveney & Meyers. In particluar, the record for O'Melveney & Meyers in the advertising database contains the following data; in the subcatagory field -intellectual property-; in the category field -Attorney- and in the location field -Los Angeles-. Next, there would be a retrieval from the advertising database of the advertising object for O'Melveney & Meyers and this would be sent the Internet user via the browser and a pop up advertisement would be displayed on the user interface for O'Melveney & Meyers. This pop up advertisement of interest to the user based on the user's request to be redirected to the web site for the Law Offices of Howard L. Hoffenberg.

Example 2

The following is a prospective example. Calvin knows his doctor's telephone number is 37 (818)708-6950. Calvin reaches his doctor's web site by entering (818)708-6950 in a query box for a portal having a URL www.bytel.org. Upon receipt of this formatted telephone number, the parsing server would executes a PERL substitution command to deformat the telephone number to produce an unformatted telephone number. In particular, 8187086950. It then adds a country code which is assumed to be North America; namely "001." This results in 0018187086950 and is referred to as the parsed user interaction. The parsed user interaction would be sent to the directory database server.

The directory database on the database server would be built using SQUID, as indicated an open source program for which a general public license is available. The records for registrants have fields for unformatted telephone number, security level, authentication, category and location. The interface of the directory database server structures a query in DBI, a generic interface for PERL to any database. The foregoing interface would communicate with a DBD second level database interface which is the driver for SQUID. The query is executed and a search result produced. This search result would be communicated by the DBD interface (driver) to the DBI driver. As stated, DBI is a generic interface for PERL. The search result would be sent to the parsing server which would execute a PERL command to parse the result to separate the values of the fields in the record.

Pursuant to the hypothetical example, the telephone number belongs to an internal medicine doctor in Tarzana, Calif. Further, pursuant to the hypothetical, the value for the security level field is "1" which indicates that the doctor requires authentication to view the page of the doctor's web site. The parsing server instructs the web page server to send and displays on the Internet user on the user's interface a dialog box to provide authentication information; namely a social security number. Upon submission by the Internet user of authentication information, the parsing server would compare the submitted number to that in the parsed search result for authentication information. If there is a match up of the authentication information, the web page server retrieves from the caching server the doctors page and returns it to the Internet user. All hyperlinks are operative and the Internet user can interact with the entire web site. The location box on the Internet user's browser would show the doctor's web site at www.geocities.com/~medical/rpr/index.html At about the same time, there would be a parallel process where the parsing server submits to the advertising server the portion of the parsed query result pertaining to category and location. The advertising database would contain records having fields for category, location, money paid and advertising object. Based on instructions from the parasing server, the advertising server would conduct successive queries of the advertising database. The first query would be based on category. The results of this query is further queried by location. The results of this query is further queried by money paid to advertise. Pursuant to this hypothetical example, the final result of the search is a company called Progressive Diabetes Products, Inc., an insulin maker. Its criteria correlates with the criteria for the Tarzana doctor. The parsing server would retrieve from the advertising server the advertising object for Progressive Diabetes Products, Inc. and web page server would send it to the Internet user as a pop up advertisement.

Although the present invention has been described in considerable detail with reference to certain preferred versions thereof, other versions are possible with substituted, varied and/or modified materials and steps are employed. These other versions do not depart from the invention. For example, the invention is described in terms of multiple databases. It within the scope of the invention that any two or more of these database can be combined into a single database such that two claim elements are satisfied by one physical element. Likewise, the invention is described in terms of multiple servers. It within the scope of the invention that any two or more of servers can be combined into a single server such that two claim elements are satisfied by one physical element. Vice versa, a database and/or server functions can be subdivided into parts such that two or more physical components satisfy one claim element. Therefore, the spirit and scope of the appended claims should not be limited to the description of the preferred versions contained herein.

What is claimed is:

1. A method for an Internet user to view a web page, the method comprising the steps of:

a) establishing a web page server where the server has a URL address and an Internet interface which allows remote access through the Internet;
    b) establishing a directory database server with a directory database comprised of:
        i. registrant telephone numbers;
        ii. registrant criteria and
        iii. associated therewith registrant web site page, where in the directory database multiple different registrant telephone numbers are associated with the same registrant web site page;
    c) establishing an advertising server with an advertising database comprised of advertiser criteria and associated therewith advertising objects;
    d) an Internet user establishing a socket to the web page server at its URL address through the Internet and interacting with the web page server where the user interaction includes in least in part a telephone number and the specification of proper security information;
    e) executing a query of the directory database to yield a query result comprising a registrant web site page corresponding to the user interaction;
    f) executing of query of the advertising database to yield a query result of an advertising object for an advertiser whose criteria correlates with the criteria for registrant whose web site page is being sent to the Internet user and
    g) sending the web site page to the Internet user through the socket established by the Internet user.

2. A method for an Internet user to view a web page, the method comprising the steps of:

a) establishing a web page server where the server has a URL address and an Internet interface which allows remote access through the Internet;
    b) establishing a parsing server;
    c) establishing a directory database server with a directory database comprised of a plurality of registrant records with each record containing at least a field for a registrant telephone number and a field for registrant web page URL;
    d) establishing a caching server with a caching database comprised of registrant web pages indexed by registrant web page URL;
    e) an Internet user interacting with the web page server where the user interaction includes at least in part a telephone number;
    f) sending the user interaction to the parsing server and the parsing server parsing the user interaction to yield a parsed user interaction;
    g) sending the parsed user interaction to the directory database server and the directory database server executing a query of the directory database to yield a query result of the record corresponding to the user interaction;
    h) sending the query result to the parsing server and the parsing serving parsing the query result to form a parsed query result separating at least registrant web page URL.
    i) sending the registrant web page URL to the caching server and the caching server returning a registrant web page corresponding to the registrant web page URL; and
    j) sending the registrant page to the Internet user.

3. The method of claim 2 where:

the records in the directory database have one or more fields containing registrant criteria;
    there is established an advertising server with an advertising database comprised of a plurality of records with each record containing one or more fields for advertiser criteria and a field for an advertising object;
    the parsing server parsers the query result to form a parsed query result separating registrant criteria;
    there is a sending of the parsed query result to the advertising database server and the advertising database server executing a query of the advertising database to yield a query result that is an advertiser record, containing an advertising object, for which the advertiser criteria correlates with the registrant criteria;
    there is a returning of the advertising object to the web page server which sends the object to the Internet user.

4. A method for an Internet user to view a web page, the method comprising the steps of:

a) establishing a web page server where the server has a URL address and an Internet interface which allows remote access through the Internet;
    b) establishing a parsing server;
    c) establishing a directory database server with a directory database comprised of a plurality of registrant records having a plurality of fields which include at least a field for registrant telephone number of fixed length, a field for registrant web page URL, a field for registrant category and a field for registrant location;
    d) establishing a caching server with caching database comprised of registrant web site pages indexed by registrant web site URLs;
    e) an Internet user interacting with the web page server where the user interaction includes at least in part a telephone number;
    f) sending the user interaction to the parsing server and the parsing server parsing the telephone number to replace and add characters to form an unformatted telephone number of fixed length;
    g) sending the unformatted telephone number of fixed length to the directory database server and the directory database server executing a minimized mismatch query of the directory database to yield a query result of a record corresponding to the user interaction which is comprised of registrant web page URL, registrant category and registrant location;
    h) sending the query result to the parsing server and the parsing server parsing the query result to form a parsed query result separating registrant web page URL, category and location;
    i) sending the registrant web site URL to the caching server and the caching server returning to the web page server the registrant web site page corresponding to the registrant web site page URL; and
    j) sending the registrant web page to the Internet user.

5. The method of claim 4 where:

there is established an advertising server with an advertising database comprised of a plurality of records with each record having a plurality of fields include at least one field for an advertising object, a field for an advertiser category and a field for an advertiser location;
    there is a sending of the registrant category and registrant location to the advertising database server and the advertising database server executing a query of the advertising database to yield a query result that is an advertiser record, containing an advertising object, for which the advertiser category and the advertiser location correlate with the registrant category and registrant location;

there is a returning of the advertising object to the web page server which sends the object to the Internet user.

6. The method of claim 1, 2 or 4 where an Internet user establishes a socket to the web page server using a browser and the user interaction comprises the user specifying in an address box of the browser the URL address for the web page server and at least in part a telephone number.

7. The method of claim 6 where the user interaction includes at least in part a telephone number and the browser completes the interaction by adding the URL address for the web page server.

8. The method of claim 1, 2 or 4 where there is remote access by one or more authorized registrants to edit the directory database.

9. The method of claim 1, 2 or, 4 where there is proximal access to the directory database to edit the directory database.

10. The method of claim 1, 2 or 4 where the registrant web site pages is periodically updated.

11. The method of claim 1, 2 or 4 further comprising the step of after receiving an user interaction, if the telephone number included within the user interaction does not correspond to a telephone number in the directory database, initiating a call to the telephone number to which a message is communicated that a user interaction has been received.

12. The method of claim 1, 2 or 4 wherein the user interaction includes at least in part a former telephone number that was previously associated with the registrant, the registrant being associated with a new telephone number, the method further comprising the step of translating the former telephone number to the new telephone number associated with the registrant and executing the remainder of the steps of the to send a registrant web site page to the Internet user.

13. The method of claim 12 further comprising the step of forwarding a message to the Internet user that indicates that the registrant is associated with a new telephone number.

14. The method of claim 1, 2 or 4 further comprising the steps of:

after receiving an user interaction, if the telephone number does not correspond to a registrant in the directory database, determining whether there is another area code valid for the telephone number other than an area code included in the user interaction;

if there is another valid area code, modifying the user interaction by using the other area code in place of the area code included in the user interaction is addressed and using the modified user interaction as the user interaction in executing the remainder of the steps to send a registrant web site page to the Internet user.

15. The method of claim 2 or 4 where the directory database is comprised multiple records having different registrant telephone numbers in the registrant telephone number field and the same registrant web page URL in the registrant web page URL field.

16. The method of claim 2 or 4 where:

records in the directory database have one or more fields containing security information;

the parsing server parsers the query result to form a parsed query result separating security information;

there is a receipt of security information from the Internet user;

if there is a match of the security information received from the Internet, then there is a sending of the registrant web site page to the Internet user.

17. An Internet advertising system for advertisers comprising the steps of:

a) establishing on a computer a directory database comprised of registrant telephone numbers and associated therewith registrant criteria and registrant web page URLs where the computer has a URL address and a server interface which allows remote access through the Internet;

b) establishing on the computer an advertising database comprised of advertiser criteria and associated therewith advertising objects;

c) a user interacting with the computer by means of a browser wherein the interaction includes in least in part a telephone number and URL address in an address box of the browser;

d) the computer performing a search of the directory database to select a registrant web page URL corresponding to the specified telephone number;

e) the computer retrieving from the advertising database an advertising object correlated to the associated registrant criteria;

f) displaying the page for the registrant web page URL on the user interface and g) displaying on the user interface the retrieved advertising object.

18. The method of claim 17 where the user interaction includes at least in part a telephone number in the address box and the browser completes the interaction by adding the URL address for the directory database.

19. The method of claim 17 where the associated registrant criteria comprises category and location; where the advertiser criteria comprises category and location and the advertising object is retrieved based on a correlation pertaining to category and location.

20. The method of claim 17 where at least one advertiser paid an amount of money to establish an advertising object in the advertising database.

21. The method of claim 20 where the advertiser criteria comprises the amount of money paid to establish an advertising object and the advertising object is retrieved based on the amount of money paid.

* * * * *